United States Patent [19]

Narui et al.

[11] Patent Number: 4,544,709

[45] Date of Patent: Oct. 1, 1985

[54] PROCESS FOR PRODUCING CHLOROSULFONATED POLYETHYLENE USING A MIXED SOLVENT

[75] Inventors: Mamoru Narui, Kudamatsu; Tatsushi Nakagawa; Yasuhiro Sakanaka, both of Shin-nanyo, all of Japan

[73] Assignee: Toyo Soda Manufacturing Co., Ltd., Shin-nanyo, Japan

[21] Appl. No.: 578,325

[22] Filed: Feb. 13, 1984

Related U.S. Application Data

[63] Continuation of Ser. No. 363,886, Mar. 31, 1982, abandoned.

[30] Foreign Application Priority Data

Apr. 30, 1981 [JP] Japan .................................. 56-64271

[51] Int. Cl.$^4$ ............................................... C08F 8/38
[52] U.S. Cl. .................................... 525/344; 524/109; 525/324
[58] Field of Search ........................................ 525/344

[56] References Cited

U.S. PATENT DOCUMENTS 2,377,217 5/1945 Dvornkoff et al. .
3,180,856 4/1965 Szalla .................................. 525/344

FOREIGN PATENT DOCUMENTS 1143641 2/1963 Fed. Rep. of Germany .
122516 1/1919 United Kingdom .
134848 4/1960 U.S.S.R. .

OTHER PUBLICATIONS

Inorganic and Theoretical Chemistry, p. 666.
Industrial and Engineering Chemistry, 16(3), 1924, "Sulfuryl Chloride", McKeo and Salls, pp. 270–282.

Primary Examiner—Christopher A. Henderson
Attorney, Agent, or Firm—Oblon, Fisher, Spivak, McClelland & Maier

[57] ABSTRACT

Chlorosulfonated polyethylene having excellent properties as elastomer is produced by dissolving polyethylene in a mixed solvent of carbon tetrachloride and a halogenated aromatic compound such as, for example, chlorobenzene and reacting polyethylene with chlorine and sulfuryl chloride or with sulfuryl chloride.

7 Claims, No Drawings

PROCESS FOR PRODUCING CHLOROSULFONATED POLYETHYLENE USING A MIXED SOLVENT

This application is a continuation of application Ser. No. 363,886, filed Mar. 31, 1982, now abandoned.

BACKGROUND OF THE INVENTION

1. Field of the Invention

This invention relates to a process for performing the chlorosulfonation of polyethylene by chlorine and sulfuryl chloride or by sulfuryl chloride alone using a specific solvent.

2. Description of the Prior Art

It is known that an elastomer having excellent properties such as weather resistance, heat resistance, etc., is obtained by vulcanizing chlorosulfonated polyethylene having a chlorine content of 25-45% and a sulfur content of 0.3-4%.

The most important point in the case of producing chlorosulfonated polyethylene by dissolving polyethylene in a solvent and reacting the polyethylene with chlorine and sulfuryl chloride or sulfuryl chloride alone is how to uniformly distribute chlorine and a chlorosulfon group on polyethylene and the properties of chlorosulfonated polyethylene greatly change by the distributions of them.

Also, the chlorosulfonation of polyethylene is in the point of destroying the crystal of polyethylene and changing it into an amorphous substance and in this case, a sufficiently high temperature is necessary for fusing the crystals of polyethylene and it is said to be necessary to dissolve polyethylene at a temperature as high as possible and chlorosulfonate polyethylene at a high temperature.

However, in the case of using a low boiling point solvent such as carbon tetrachloride (boiling point 76.7° C.), which is generally used, it is very difficult to perform the uniform distribution of chlorine (U.S. Pat. No. 4,145,491) and even when a chlorination is performed to a considerable extent, the crystals of polyethylene remain in chlorosulfonated polyethylene formed.

Therefore, there is proposed a process of restraining the influence of the crystals of polyethylene as low as possible by performing the production of chlorosulfonated polyethylene in two steps, that is, by performing chlorination of polyethylene with chlorine at a temperature as high as possible (~160° C.) in the first step to chlorinate to some extent and chlorosulfonating the polyethylene with sulfuryl chloride in the second step (see, U.S. Pat. No. 2,972,604). However, even in such a process, it is very difficult to establish the condition for obtaining a constant quality in the reaction using a low boiling temperature, such as carbon tetrachloride.

For overcoming the difficulty, a process may be considered wherein using a solvent having a high boiling point and a high dissolving power for polyethylene or the partially chlorinated product of it, polyethylene or the partially chlorinated product thereof is reacted in the solvent at a high temperature, but when such a high-boiling solvent is used, it is difficult to separate and recover the solvent from the polymer solution formed with a good efficiency as well as there are problems on the properties of the product. For example, when a drum drying method is employed for isolating chlorosulfonated polyethylene from the reaction mixture, the polymer formed must be isolated at temperature higher than the boiling point of the solvent used for the reaction and in this case, chlorosulfonated polyethylene is liable to color or deteriorate and also the solvent remains in the polymer to give various undesirable influences on the properties of the elastomer.

Accordingly, there is still a need for a process of producing a high quality chlorosulfonated polyethylene having an excellent quality of an elastomer while obtaining a constant quality product where the chlorine and chlorosulfone groups are uniformly distributed.

SUMMARY OF THE INVENTION

It is an object of this invention to provide a method to overcome the difficulties found in the reaction of producing chlorosulfonated polyethylene and the quality of the product. It is another object of the present invention to provide a process of producing chlorosulfonated polyethylene having excellent properties as elastomer by preventing the occurrence of reduction in properties of the product caused by the remaining crystals of polyethylene and the nonuniform distribution of chlorine, which is the undesirable problem in the foregoing conventional solution process using a low-boiling solvent and the reaction for producing chlorosulfonated polyethylene.

It is yet another object of the present invention to provide a process of producing chlorosulfonated polyethylene by dissolving polyethylene in a solvent and reacting the polyethylene with chlorine, and sulfuryl chloride or with sulfuryl chloride alone, wherein the reaction is performed using a mixed solvent composed of carbon tetrachloride and a halogenated aromatic compound, the content of the latter, i.e., the halogenated aromatic compound being in a range of 0.5-20% by weight of the total amount of the mixed solvent.

DETAILED DESCRIPTION OF THE PREFERRED EMBODIMENTS

As the halogenated aromatic compound used in this invention, there are various kinds of mono- or tri-halogen substitution compounds containing a benzene ring but from an industrial viewpoint, chlorobenzene, chlorotoluene, iodobenzene, benzene fluoride, bromobenzene, etc. are particularly preferred in one embodiment of the present invention. The halogenated aromatic compound is contained in the mixed solvent in an amount of 0.5-20% by weight of the total amount of the mixed solvent but the preferable content thereof is 1-10% by weight. If the content of the halogenated aromatic compound is less than the aforesaid range, the chlorosulfonated polyethylene obtained does not exhibit the effects of this invention and shows inferior heat aging property and inferior low-temperature property although the tensile strength is excellent. On the other hand, if the content of the halogenated aromatic compound is higher than the aforesaid range, the chlorosulfonated polyethylene obtained is undesirably colored and emits a foul odor as well as the properties of the product, such as tensile strength, etc., become greatly inferior.

The chlorosulfonated polyethylene obtained by the process of this invention using the mixed solvent according to the teachings of this invention is excellent in character as elastomer as compared to those obtained using carbon tetrachloride alone as the reaction solvent and also excellent in properties such as workability and tensile strength as compared to the case of using a halogenated aromatic compound alone. That is, the chlorosulfonated polyethylene obtained by using carbon tetrachloride alone as the reaction solvent possesses high modulus and tensile characteristics caused by the insufficiency in solubility of polyethylene crystals in the low-boiling solvent and ununiformity of the distribution of chlorine as well as is inferior in low-temperature characteristics and workability and has higher plasticity. On the other hand, in the case of using a high-boiling halogenated aromatic compound such as, for example, chlorobenzene having a boiling point of 131° C., the solubility of polyethylene and the partially chlorinated product thereof is sufficiently high and the distribution of chlorine becomes uniform but the removal of the remaining solvent is difficult, which results in emitting a strong foul odor at compounding or fabricating the product, and the polymer obtained is, in particular, liable to color and is greatly inferior in tensile strength, compression set, etc., although the low-temperature characteristics thereof may be excellent. In yet another embodiment of the present invention, branched polyethylene obtained by a high-pressure polymerization process and straight chain polyethylene obtained by a medium-pressure or low-pressure polymerization process can be used as polyethylene to be chlorosulfonated and also ethylene copolymers containing up to 10% by weight monomer capable of copolymerizing with ethylene, such as, for example, propylene, butene-1, acrylic acid, vinyl acetate, etc., can be used in this invention and are included in the range of polyethylene in this invention.

Polyethylene is dissolved in the mixed solvent of carbon tetrachloride and a halogenated aromatic compound at a temperature of 90°–130° C. The proportion of polyethylene to the whole solvent is 2–20% by weight.

The chlorosulfonation of polyethylene is performed by reacting the polyethylene in the solution described above with chlorine and sulfuryl chloride or with sulfuryl chloride alone under pressure at a temperature of 60°–130° C. When polyethylene is reacted with sulfuryl chloride only, there is a feature that the reaction can be performed at a high temperature and a constant temperature from the beginning to the end of the reaction.

The chlorosulfonation reaction is usually performed using an azo compound such as azobisisobutyronitrile or a peroxide such as benzoyl peroxide as the reaction initiator and in the case of adding sulfuryl chloride, a tertiary amine such as pyridine is added as a catalyst.

Polyethylene is thus converted into chlorosulfonated polyethylene having a chlorine content of 25–45% and a sulfur content of 0.3–4% by such an operation. The reaction is performed in a glass-lined pressure vessel which is generally used for such a kind of reaction, the unreacted gas and produced gases formed during the reaction are released or removed from the system for maintaining the pressure in the vessel at a contstant pressure (0.5–5 kg/cm$^2$), and after the reaction is finished, the gases remaining in the system are removed by introducing an inert gas such as nitrogen into the system.

To the reaction solution of chlorosulfonated polyethylene thus obtained is, then, added a small amount of an epoxy compound such as a condensate of epichlorohydrin and bisphenol A as a stabilizer, and then the solution is supplied onto a drum heated so that the volatile contents in the chlorosulfonated polyethylene become below 1% and the chlorosulfonated polyethylene is continuously collected as a thin film while rotating slowly the drum.

Having generally described the invention, a more complete understanding an be obtained by reference to certain specific examples, which are provided therein for purposes of illustration only, and are not intended to be limiting unless otherwise specified. In addition, all parts and % in the examples are by weight unless otherwise indicated.

EXAMPLE 1

In a 30 liter glass-lined autoclave equipped with a stirrer were charged 3500 g of straight chain polyethylene having a melt index of 6.5 and a density of 0.961 produced by a medium-pressure polymerization process, 34,650 g of carbon tetrachloride, and 350 g of chlorobenzene and after sealing the inside of the system by nitrogen, the mixture was heated with stirring. When the temperature of the inside of the system reached 110° C., the mixture was further stirred at the temperature to dissolve the polyethylene over a period of one hour. Therefore, a chlorine gas pressed at 3 kg/cm$^2$ by gage pressure was introduced into the system from the bottom of the reaction vessel at a rate of 3.5 liters/min. In this case, 2 g of azobisisobutyronitrile was added as a reaction initiation catalyst. The introduction of chlorine ws continued at the same temperature unil the chlorination of polyethylene reached about 30% and when the chlorination reached the definite value, the introduction of the chlorine gas was stopped and at the same time, the temperature of the system was reduced to 70° C.

When the temperature of the system reached 70° C., 1547 g of sulfuryl chloride was added to the reaction system and then the reaction was performed for about one hour. In this case, 8.1 g of pyridine and 0.2 g of azobisisobutyronitrile were added to the reaction system as a catalyst. After the reaction was finished, while introducing a small amount of nitrogen in the system, chlorine, sulfur dioxide, and hydrogen chloride, which were the unreacted or produced gases existing in the system as remaining acid components were removed at a temperature of 70°–80° C. After the removal of the remaining acid components was finished, about 50 g of an epoxy compound such as a condensate of epichlorohydrin and bisphenol A was added to the reaction mixture as a stabilizer chlorosulfonated polyethylene was separated from the reaction mixture by means of a drum dryer heated to 150° C.±5° C. and also the solvents used in the reaction were recovered. Thus, 4956 g of chlorosulfonated polyethylene was obtained.

Then, following various measurements were performed using a part of the product.

First, after dissolving the chlorosulfonated polyethylene in benzene, the chlorosulfonated polyethylene was precipitated again in methanol and dried to provide a sample for analysis, and the contents of chlorine and sulfur were analyzed. Then, the raw rubber Mooney viscosity of the product was measured according to JIS K 6300.

Then, a mixture of 100 parts of the chlorosulfonated polyethylene, 10 parts of magnesia, and 0.8 part of ethylenethiourea was kneaded by rolls at about 50° C. and press-cured at a temperature of 150° C. and a gas pressure of 200 kg/cm$^2$ to provide a sample for measurement of properties.

The tensile characteristics were measured on the sample cured for 20 minutes according to JIS K 6301 and also the heat resisting aging property thereof was measured after aging the sample for 96 hours at 150° C. Also, the compression set was measured on the sample cured for 40 minutes according to JIS K 6301. Furthermore, the low-temperature characteristics were measured on the sample cured for 40 minutes according to ASTM D-1329-547, the shrinkage was calculated, and the temperature at 10% shrinkage and 70% shrinkage were calculated as TR-10 and TR-70 respectively. These evaluation results are shown in Table 1 and Table 2.

EXAMPLE 2

By following the same procedure as in Example 1 except that the amount of carbon tetrachloride was changed to 33,950 g and 1050 g (the ratio in the mixed solvent was 3%) of chlorobenzene was used, 5080 g of chlorosulfonated polyethylene was obtained. The results on the product are shown in Tables 1 and 2.

EXAMPLE 3

By following the same procedure as in Example 1 except that the amount of carbon tetrachloride was changed to 32,550 g and 2450 g (the ratio in the mixed solvent was 7%) of chlorobenzene was used, 4967 g of chlorosulfonated polyethylene was obtained. The results on the product are shown in Tables 1-2.

EXAMPLE 4

By following the same procedure as in Example 1 except that the amount of carbon tetrachloride was changed to 31,500 g and 3500 g (the ratio in the mixed solvent was 10%) of chlorobenzene was used, 4781 g of chlorosulfonated polyethylene was obtained.

The results on the product are shown in Tables 1-2.

EXAMPLE 5

By following the same procedure as in Example 2 except that a chlorine gas was not introduced, 7,180 g of sulfuryl chloride, 5.0 g of azobisisobutyronitrile, and 8.1 g of pyridine were added to the reaction system, and the reaction was performed at 110° C. over a period of 5 hours, 4888 g of chlorosulfonated polyethylene was obtained. The results are shown in Tables 1-2.

Comparison Example 1

By following the same procedure as in Example 1 except that the amount of carbon tetrachloride was changed to 24,500 g and 10,500 g (the ratio in the mixed solvent was 30%) of chlorobenzene was used, 4780 g of chlorosulfonated polyethylene was obtained. The results on the product are shown in Tables 1-2.

Comparison Example 2

By following the same procedure as in Example 1 except that 35,000 g of chlorobenzene only was used in place of the mixed solvent, 4980 g of chlorosulfonated polyethylene was obtained. The results on the product are shown in Tables 1-2.

Comparison Example 3

By following the same procedure as in Example 1 except that 35,000 g of carbon tetrachloride only was used in place of the mixed solvent, 4949 g of chlorosulfonated polyethylene was obtained. The results are shown in Tables 1-2.

The results shown in Tables 1 and 2 show that the chlorosulfonated polyethylene obtained by the process of this invention does not show coloring and does not emit foul odor and the cured product thereof possesses good tensile characteristics, heat resisting aging property, compression set, and TR test results.

On the other hand, in Comparison Examples 1 and 2, the polymers produced showed coloring and emitted foul odor and also the cured product thereof was inferior in tensile strength, heat resisting aging property, and compression set to those of the examples of this invention. Also, the polymer obtained in Comparison Example 3 did not emit foul odor and did not show coloring and although the cured product showed a higher tensile strength and lower compression set than those in the examples of this invention, the product was inferior in heat resisting aging property TR to the products in the examples of this invention and has higher plasticity than the latter.

Having now fully described the invention, it will be apparent to one of ordinary skill in the art that many changes and modifications can be made thereto without departing from the spirit or scope of the invention as set forth therein.

TABLE 1

| Item | No. | Examples | | | | | Comparative Examples | | |
|---|---|---|---|---|---|---|---|---|---|
| | | 1 | 2 | 3 | 4 | 5 | 1 | 2 | 3 |
| Proportion of chlorobenzene in mixed solvent (%) | | 1 | 3 | 7 | 10 | 3 | 30 | 100 | 0 |
| Analytical values and properties of produced chloro-sulfonated polyethylene | | | | | | | | | |
| Chlorine content (wt. %) | | 35.7 | 36.1 | 35.9 | 35.7 | 35.2 | 35.2 | 35.6 | 34.9 |
| Sulfur content (wt. %) | | 1.10 | 1.25 | 1.18 | 1.27 | 0.83 | 1.00 | 1.01 | 0.98 |
| Raw rubber Mooney viscosity (100° C.) | | 58 | 59 | 58 | 55 | 54 | 56 | 61 | 63 |
| Coloring of polymer | | white | white | white | white | white | light yellow | light brown | white |
| Odor at rolling | | almost no odor | almost no odor | almost no odor | almost no odor | almost no odor | strong peculiar odor | strong peculiar odor | almost no odor |

TABLE 2

| Item | No. | Examples | | | | | Comparative Examples | | |
|---|---|---|---|---|---|---|---|---|---|
| | | 1 | 2 | 3 | 4 | 5 | 1 | 2 | 3 |
| Vulcanizate properties of chlorosulfonated polyethylene | | | | | | | | | |
| Tensile characteristics | | | | | | | | | |
| Tensile strength (Kg/cm$^2$) | | 195 | 187 | 178 | 162 | 174 | 133 | 124 | 221 |
| 300% modulus (Kg/cm$^2$) | | 47 | 46 | 43 | 27 | 39 | 42 | 37 | 54 |
| Elongation (%) | | 560 | 600 | 590 | 660 | 620 | 660 | 570 | 570 |

TABLE 2-continued

| Item | No. | Examples | | | | | Comparative Examples | | |
|---|---|---|---|---|---|---|---|---|---|
| | | 1 | 2 | 3 | 4 | 5 | 1 | 2 | 3 |
| Hardness | | 63 | 63 | 63 | 62 | 63 | 61 | 58 | 65 |
| Heat-resisting aging property | | | | | | | | | |
| Tensile strength change ratio (%) | | −18 | −18 | −14 | −12 | −16 | −18 | −13 | −28 |
| Elongation change ratio (%) | | −59 | −59 | −58 | −60 | −57 | −60 | −66 | −62 |
| Hardness change | | +9 | +7 | +9 | +10 | +8 | +14 | +17 | +16 |
| Compression set (%) | | 37 | 38 | 37 | 39 | 36 | 42 | 46 | 31 |
| TR test | | | | | | | | | |
| TR-10(°C.) | | −8 | −6 | −6 | −8 | −6 | −7 | −8 | −4 |
| TR-70(°C.) | | +5 | +8 | +7 | +5 | +7 | +3 | +4 | +19 |

What is claimed as new and desired to be secured by Letters Patent of the United States is:

1. A process of producing chlorosulfonated polyethylene by dissolving polyethylene in a mixed solvent and reacting it with either sulfuryl chloride or sulfuryl chloride and chlorine, wherein said mixed solvent comprises carbon tetrachloride and a halogenated aromatic compound selected from the group consisting of chlorobenzene, chlorotoluene, iodobenzene, benzenefluoride and bromobenzene, and further wherein the proportion of said halogenated aromatic compound is between 1.0 and 10.0% by weight of the total amount of mixed solvent.

2. The process of claim 1, wherein the polyethylene is selected from the group consisting of branched polyethylene obtained by high pressure polymerization, straight chain polyethylene obtained by medium-pressure or low-pressure polymerization and ethylene copolymers containing up to 10% by weight of monomer capable of polymerization with ethylene.

3. The process of claim 2, wherein the monomer contained in the ethylene copolymer is selected from the group consisting of propylene, 1-butene, acrylic acid and vinyl acetate.

4. The process of claim 1, further comprising the addition of a catalyst selected from the group consisting of an azo compound, a peroxide and a tertiary amine.

5. The process of claim 4, wherein the azo compound is azo bis isobutyronitrile, the peroxide is benzoyl peroxide and the tertiary amine is pyridine.

6. The method of claim 1, further comprising:
   maintaining a constant pressure of between 0.5 and 5 Kg/cm$^2$ during the reaction by releasing unreacted gases or gases formed during said reaction; and
   introducing an inert gas after the reaction is finished to remove the remaining gases.

7. The method of claim 6, wherein the inert gas is N$_2$.

* * * * *